United States Patent
Pudipeddi

(10) Patent No.: US 10,216,596 B1
(45) Date of Patent: Feb. 26, 2019

(54) FAST CONSISTENT WRITE IN A DISTRIBUTED SYSTEM

(71) Applicant: BiTMICRO Networks, Inc., Fremont, CA (US)

(72) Inventor: Bharadwaj Pudipeddi, San Jose, CA (US)

(73) Assignee: BiTMICRO Networks, Inc., Fremont, CA (US)

( * ) Notice: Subject to any disclaimer, the term of this patent is extended or adjusted under 35 U.S.C. 154(b) by 0 days.

(21) Appl. No.: 15/396,557

(22) Filed: Dec. 31, 2016

(51) Int. Cl.
G06F 11/00 (2006.01)
G06F 11/20 (2006.01)
G06F 13/42 (2006.01)
G06F 13/20 (2006.01)
G06F 13/16 (2006.01)
G06F 12/10 (2016.01)

(52) U.S. Cl.
CPC ...... *G06F 11/2069* (2013.01); *G06F 11/2064* (2013.01); *G06F 12/10* (2013.01); *G06F 13/16* (2013.01); *G06F 13/20* (2013.01); *G06F 13/4282* (2013.01); *G06F 2201/805* (2013.01); *G06F 2201/82* (2013.01); *G06F 2212/154* (2013.01); *G06F 2212/65* (2013.01)

(58) Field of Classification Search
CPC ............ G06F 11/2064; G06F 11/2069; G06F 11/2082; G06F 12/10; G06F 13/16; G06F 13/20; G06F 13/4282; G06F 2201/805; G06F 2201/82; G06F 2212/154; G06F 2212/65
See application file for complete search history.

(56) References Cited

U.S. PATENT DOCUMENTS

| | | | | |
|---|---|---|---|---|
| 6,094,443 A * | 7/2000 | Dwork | ...................... | G06F 7/02 370/510 |
| 6,151,681 A | 11/2000 | Roden et al. | | |
| 6,745,305 B2 * | 6/2004 | McDowell | .......... | G06F 11/2066 711/162 |
| 8,386,433 B1 * | 2/2013 | Kadayam | .......... | G06F 17/30174 707/646 |
| 9,037,671 B2 * | 5/2015 | Weber | .................... | G06F 3/0607 709/212 |
| 9,537,710 B2 * | 1/2017 | Shankar | .............. | G06F 11/2028 |
| 9,582,383 B2 * | 2/2017 | Fagiano | .............. | G06F 11/2069 |
| 2003/0105931 A1 * | 6/2003 | Weber | .................. | G06F 11/2076 711/162 |
| 2004/0088505 A1 * | 5/2004 | Watanabe | ............. | G06F 3/0608 711/161 |
| 2007/0157206 A1 | 7/2007 | Rakvic et al. | | |
| 2008/0052708 A1 | 2/2008 | Zhong | | |
| 2011/0289519 A1 | 11/2011 | Frost | | |

(Continued)

OTHER PUBLICATIONS

NVMe Direct, Feb. 2016, QLogic, pp. 1-5.*
Office Action dated Jan. 3, 2018 for U.S. Appl. No. 15/483,893.

*Primary Examiner* — Marc Duncan

(57) ABSTRACT

Embodiments of the invention provide a system and method to vastly improve the remote write latency (write to remote server) and to reduce the load that is placed on the remote server by issuing auto-log (automatic log) writes through an integrated networking port in the SSD (solid state drive). Embodiments of the invention also provide a system and method for a PCI-e attached SSD to recover after a failure detection by appropriating a remote namespace.

17 Claims, 7 Drawing Sheets

(56) References Cited

U.S. PATENT DOCUMENTS

| | | | |
|---|---|---|---|
| 2014/0215277 A1 | 7/2014 | Judd | |
| 2015/0269039 A1* | 9/2015 | Akirav | G06F 11/2007 |
| | | | 714/4.11 |
| 2015/0312337 A1* | 10/2015 | Keremane | H04L 67/1095 |
| | | | 709/217 |
| 2016/0085718 A1* | 3/2016 | Huang | H04L 29/08 |
| | | | 709/213 |
| 2016/0364271 A1 | 12/2016 | Burger et al. | |
| 2016/0373416 A1 | 12/2016 | Burger et al. | |
| 2016/0378568 A1 | 12/2016 | Knox et al. | |
| 2017/0034268 A1* | 2/2017 | Govind | H04L 67/1097 |

* cited by examiner

Distributed System with 2 (or more) servers connected to network via NICs

Internals of an SSD with Compute (CE),
Networking (NE), Fabric (FE), and Media (ME)

PCIe and Network may have entirely separate logical namespaces, but either can override the other in case of failure.

FAST CONSISTENT WRITE IN A DISTRIBUTED SYSTEM

FIELD

Embodiments of the invention relate generally to the field of storage systems and relate more particularly to the field of enterprise storage where remote write latency is one of the determining factors of overall cluster performance.

DESCRIPTION OF THE RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

In a distributed storage cluster such as Server-SAN (server-storage area network) or a Cassandra (i.e., Apache Cassandra distributed database system), a safe write is a write that is written consistently to local and remote servers. The local server would have the primary copy and the remote server would have a secondary copy or a log for the local server. The longest path is the remote write that needs to travel over the network, interrupt the remote server, write to the remote drive, and then return back to the host. A big fraction of this latency component is the interrupt-processing latency of the remote server. Not only is this interrupt-processing a latency issue, but this interrupt-processing also takes up remote server CPU (central processing unit or processor) resources such as memory and compute to process the remote requests.

Accordingly, conventional systems do not solve the problem of remote write latency and the additional load that is placed on the resources in the remote server. Therefore, there is a continuing need to overcome the constraints or disadvantages of conventional systems.

SUMMARY

Embodiments of the invention provide a system and method to vastly improve the remote write latency (write to remote server) and to reduce the load that is placed on the remote server by issuing auto-log (automatic log) writes through an integrated networking port in the SSD (solid state drive).

Embodiments of the invention also provide a system and method for a PCI-e attached peripheral component to complete a write operation and its consistency operation (through a derivative mirror write or log operation) without external software intervention. Therefore, an embodiment of the invention provides a fast consistent write operation without external software intervention.

Embodiments of the invention also provide a system and method for a PCI-e attached SSD to recover after a failure detection by appropriating a remote namespace.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

Figure 1A:
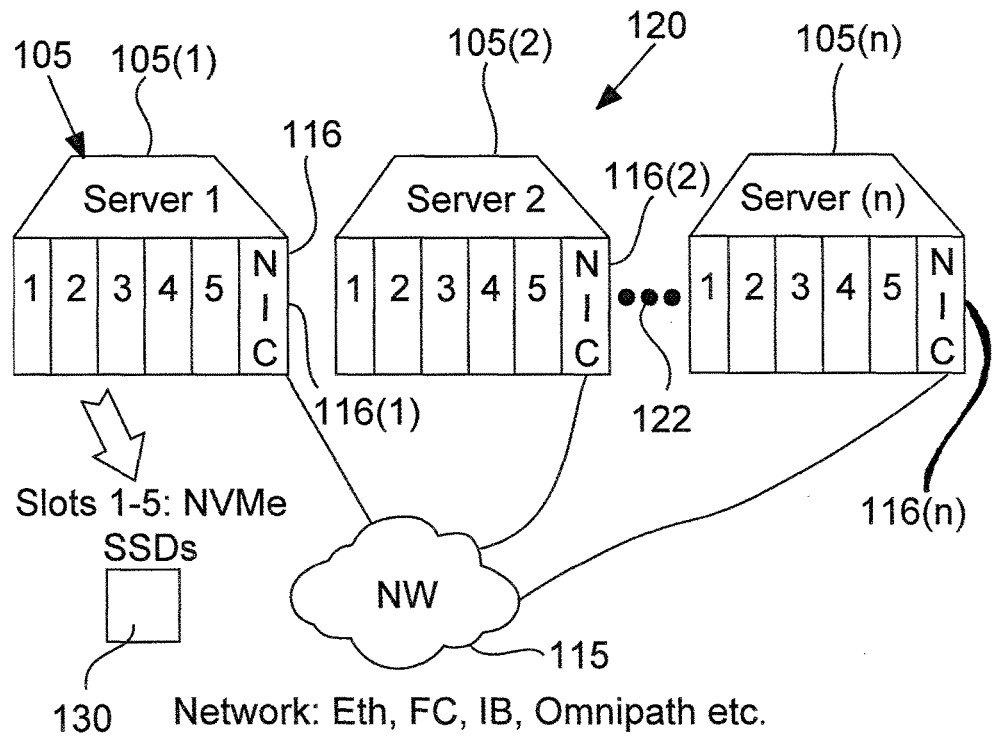
FIG. 1A is a block diagram of a distributed system with two or more servers connected to a network via NICs (network interface cards).

FIG. 1A is a block diagram that shows two servers 105 (e.g., Server1 105(1) and Server2 105(2)) that are connected via a network (NW) 115. The servers 105 are connected to the network 115 via network interface cards (NICs). For example the servers 105(1), 105(2), and 105(n) are connected to the network 115 via NICs 116(1), 116(2), and 116(n), respectively. The servers 105 are part of a distributed server-storage system 120 (sometimes also known as a server SAN 120). There can be more than two servers 105 in the system 120 as symbolically shown by the dotted symbols 122. For example, there can be up to an n-number of servers 105 in the system 120, wherein n is an integer. In the example of FIG. 1A, the server 105(n) can be a third server 105(3) connected to the network 115 if n=3.

In this network 115, some or all of the primary storage is actually distributed across the servers 105 instead of coming from a central station. The servers 105 have interface elements 116 (e.g., HBAs (host bus adapters) or NICs (Network Interface Cards) to communicate (with each other and/or with other devices) via the network 115. In the example of FIG. 1A, the servers 105(1), 105(2), and 105(n) comprise interface elements (e.g., NICs) 116(1), 116(2), and 116(n), respectively. In order to perform a safe and consistent write, a server 105 such as Server1 105(1) not only writes to its local drives, but the Server1 105(1) may also have to write (or log) in one or more remote servers (e.g., Server1 105(2), Server(n) 105(n), and/or other servers that are remote from the Server1 in the server SAN 120).

Each server 105 has a plurality of slots (e.g., slots 1 through 5) for holding NVMe-SSDs 130 (non-volatile memory express solid state drives 130).

Figure 1B:
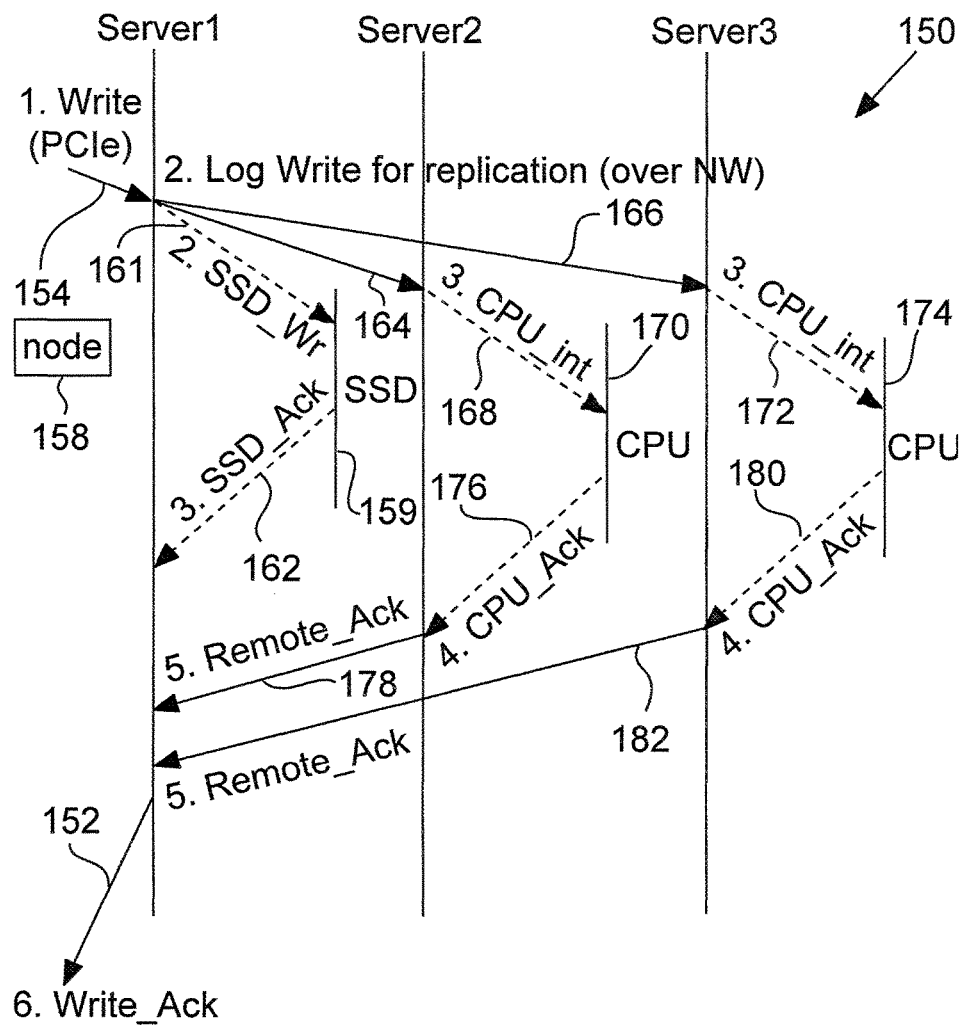
FIG. 1B is a flow diagram that shows the anatomy of a consistent write.

FIG. 1B is a flow diagram 150 that shows the anatomy of a consistent write. The latency of the final acknowledgement (Write_Ack) 152 to the write (Write(PCIe) 154 is a product of primarily the six stages shown in the flow diagram 150. In accordance with previous methods, a node 158 (e.g., a host) sends a write (Write(PCIe)) 154 to the local Server1 105(1) and receives a final acknowledgement (Write_Ack) 152 from the local Server1 105(1). In the example of FIG. 1B, the remote server (or remote servers) are Server2 and Server3 in a server SAN. There can be more than two remote servers (or only one remote server) in the example of FIG. 1B. In the first step (1), the write 154 is sent to the local SSD 159 of the local server1 and also to the remote server or remote servers (e.g., remote servers comprising Server2 and Server3 in the example of FIG. 1B). In the second step (2), the local SSD completes its write to the local SSD 159 while the remote write is interrupting (or queuing) on the remote server(s) and is waiting for the software running on the remote server(s) to write to the remote SSD(s) in the remote server(s). This second step shows the local SSD write (SSD_Wr) 161 being received by the SSD 159 and the SSD 159 transmits an SSD write acknowledgement (SSD_Ack) 162 in Server1. This second step also shows the local Server1 transmitting the remote writes 164 and 166 via network 115 to the remote servers Server2 and Server3, respectively.

In the third step (3), the remote server performs the write to the SSD in the remote server. This third step shows the remote server Server2 transmitting a CPU interrupt (CPU_Int) 168 to the CPU (central processing unit) 170 of Server2 in response to the remote write 164, and also shows the remote server Server3 transmitting a CPU interrupt (CPU_Int) 172 to the CPU 174 of Server3 in response to the remote write 166.

In the fourth step (4) and fifth step (5), the acknowledgement from the remote SSD is sent back to the local server completing the write. In this scenario, the write latency is not only long but the remote writes demands resources from the local server and the remote server(s). The fourth step shows the CPU 170 transmitting a CPU acknowledgement (CPU_Ack) 176 in the remote Server2 after the remote write is completed in the remote SSD in remote Server2. The fifth step then shows the remote Server2 transmitting a remote acknowledgement (Remote_Ack) 178 to the local Server1 in response to the CPU_Ack 176.

Similarly, the fourth step shows the CPU 174 transmitting a CPU acknowledgement (CPU_Ack) 180 in the remote Server3 after the remote write is completed in the remote SSD in remote Server3. The fifth step then shows the remote Server3 transmitting a remote acknowledgement (Remote_Ack) 182 to the local Server1 in response to the CPU_Ack 180.

After the local Server1 receives each and all of the acknowledgements SSD_Ack 162, Remote_Ack 178, and Remote_Ack 182, the local Server1 then transmits the Write_Ack 152 to the node 158 in order to acknowledge the successful completion of the write 154 in the Server SAN.

To improve the efficiency of one consistent write operation, an embodiment of this invention reduces the total write messages issued by the local server software (in local Server1) to only one. The local SSD 159 receiving the write operation 154 then auto-generates the log writes to the remote SSDs directly avoiding CPU intervention and more server-level software resource consumption. Therefore, an embodiment of the invention advantageously takes away one major step in the latency (processing at a remote server) as well as advantageously simplifying the local server writes and reducing overall resource consumption. An embodiment of the invention provides an enterprise-class distributed system that advantageously provides a fast consistent write.

An embodiment of the invention provides a system and method for a PCI-e attached peripheral component to complete a write operation and its consistency operation, through a derivative mirror write operation (mirroring write) or log operation (log write) without external software intervention. The peripheral component can be, for example, an NVMe-SSD.

Figure 2:
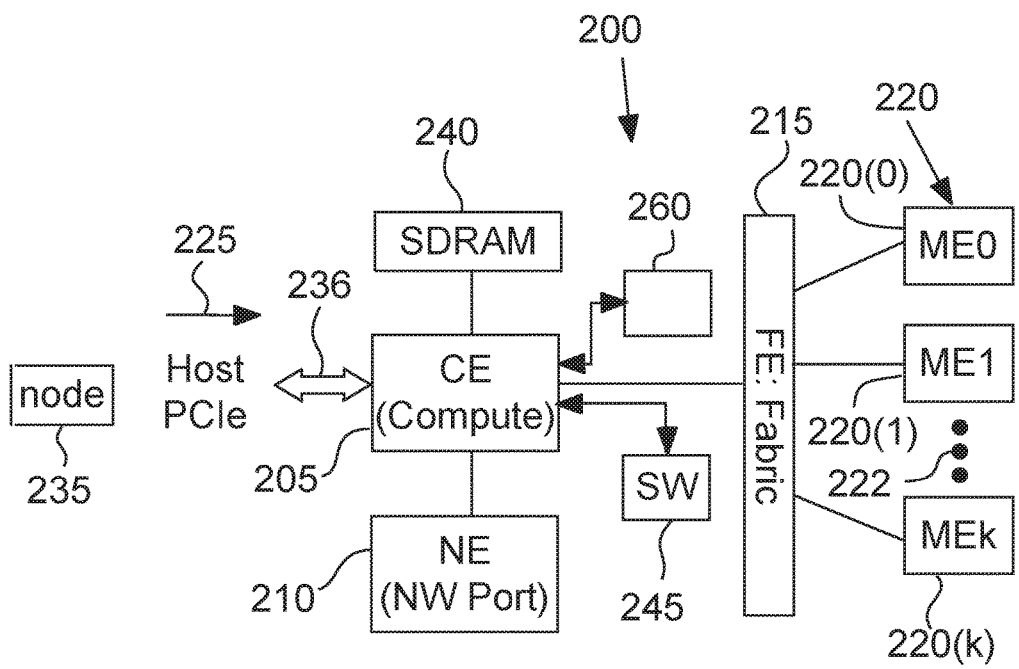
FIG. 2 is a block diagram that shows the internal components of an SSD (solid state drive) with a Compute Element (CE), Networking Element (NE), Fabric Element (FE), and Media Element (ME), in accordance with an embodiment of the invention.

FIG. 2 is a block diagram that shows the internal components of a peripheral component 200, in accordance with an embodiment of the invention. The peripheral component 200 can be, for example an SSD (solid state drive) 200 with a Compute Element (CE) 205, Networking Element (NE) 210, Fabric Element (FE) 215, and Media Element (ME) 220, in accordance with an embodiment of the invention. The SSD 200 can also be an NVMe-SSD 320 as shown in FIG. 3B. The number of media elements 220 may vary as symbolically shown by the dot symbols 222. In the example of FIG. 2, the media elements 220 comprises media elements (ME0) 220(0), (ME1) 220(1), and (MEk) 220(k), wherein k is an integer.

FIG. 2 demonstrates a peripheral PCI-e SSD (Peripheral Component Interconnect Express SSD) component 200 with the Compute Element (CE) 205 to process requests 225 from a node 235. The CE 205 is connected to the host 235 (node 235) via PCI-e 236. The CE 205 has a SDRAM (synchronous dynamic random access memory) 240 as well as the fabric interconnect (FE) 215 to connect to the storage media (ME) 220. These are elements found in a standard SSD. To enable fast writes, the SSD 200 is given an integrated networking element (NE) 210 (which provides a network port) and an embedded networking software 245 is run on the compute engine CE.

The SSD 200 has multiple namespaces. Some namespaces are used by the host 235 from the PCI-e side while the other namespaces are used by remote agents through the networking port NE 210. In the event of a recovery from failure, all namespaces can be appropriated by either interface (PCIe 236 or NE 210).

The CE 205 typically includes a central chip that interfaces to the host 235, memory 240 (e.g., an SDRAM), and the storage media 200 which can comprise non-volatile media such as, for example, flash memory.

Figure 3A:
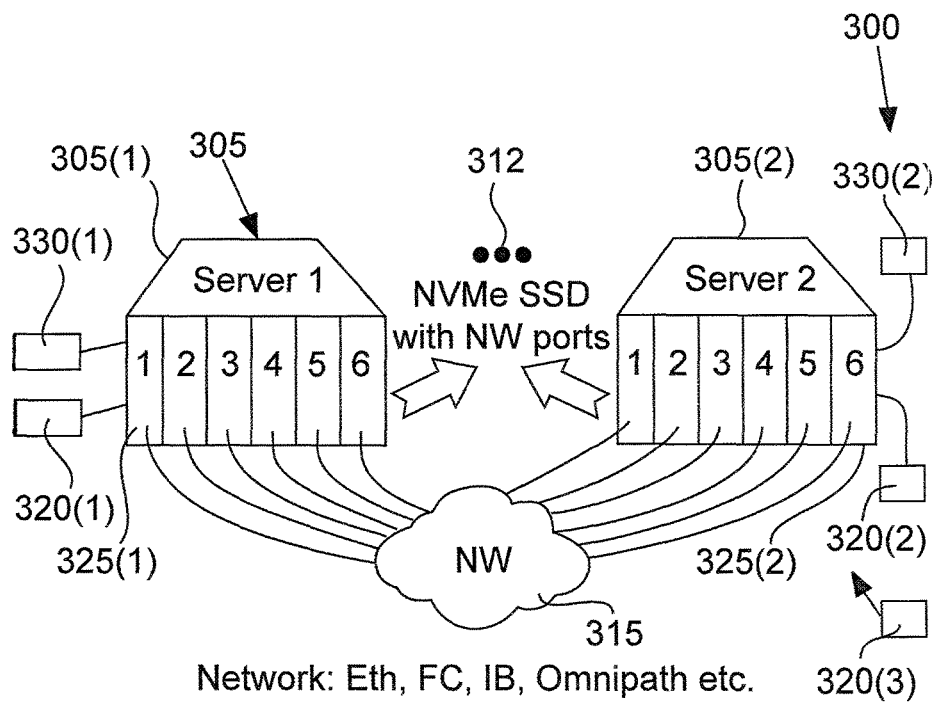
FIG. 3A is a block diagram that shows a cluster of servers with a distributed storage where the SSDs are directly networking with their integrated networking ports, in accordance with an embodiment of the invention.
Figure 3B:
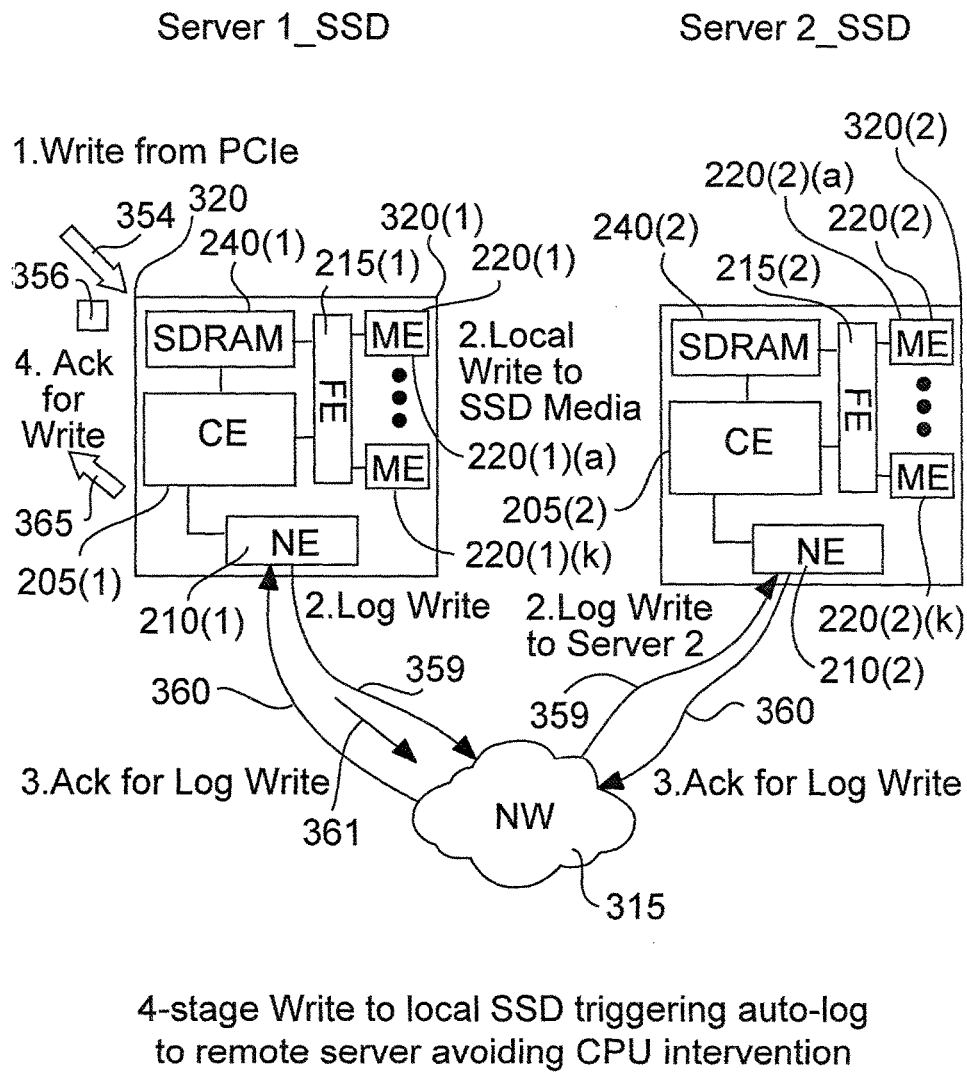
FIG. 3B is a block diagram that shows how the latency of consistent writes is reduced to 4-stages in an embodiment of the invention, as compared to the 6-stage latency of consistent writes of current systems.

FIG. 3A is a block diagram that shows a cluster of servers with a distributed storage where the SSDs are directly networking with their integrated networking ports, in accordance with an embodiment of the invention. The switching between the SSDs in the servers can be internal, external, or a combination of both. In the distributed server-storage system 300 (server SAN 300), the number of servers 305 may vary in number as symbolically shown by the dotted symbols 312. For example, there can be up to an n-number of servers 305 in the system 300, wherein n is an integer.

The servers 305 are connected to the network (NW) 315. For example, the servers 305(1) and 305(2) are connected to the network 315. The server 305(1) comprises an NVMe-SSD 320(1) with an integrated network port 325(1) that is directly networking with the network 315. The server 305(1) can include one or more additional NVMe-SSDs 320(1) with corresponding integrated networking ports 325(1). A switch 330(1), which can be internal or external to the server (Server1) 305(1), performs switching to permit any of the integrated network ports 325(1) to directly network in the network 315 and server-SAN 300. Therefore, the switch 330(2) connects the NVMe-SSDs 320(2) the network 315.

Similarly, the server 305(2) comprises an NVMe-SSD 320(2) with an integrated network port 325(2) that is directly networking with the network 315. The server 305(2) can include one or more additional NVMe-SSDs 320(2) with corresponding integrated networking ports 325(2). A switch 330(2), which can be internal or external to the server (Server2) 305(2), performs switching to permit any of the integrated network ports 325(2) to directly network in the network 315 and server-SAN 300. Therefore, the switch 330(2) connects the NVMe-SSDs 320(2) the network 315.

The server software (networking software 245 in FIG. 2) running the stack consider the SSD (e.g., each of the SSDs 320(1)) not as direct-attached isolated storage, but as a special storage drive that can mirror or log its own writes remotely. The server software 245 therefore needs to configure the SSD 320(1) for mirroring or logging remote writes.

The SSD 320(1) can duplicate (mirroring or logging) with up to "z" copies where the value of "z" and the addresses (IP or Internet Protocol addresses for TCP/IP or Transmission Control Protocol/Internet Protocol) are stored in a configuration space. For example, this configuration space 260 (FIG. 2) is stored and maintained in a memory in CE 205. For mirroring, the write is replicated to the same block address in remote SSDs 320(2). For logging, the write and its associated metadata are logged in circular namespaces in the remote SSDs 320(2).

FIG. 3B is a block diagram that shows how the latency of consistent writes is reduced to 4-stages in an embodiment of the invention, as compared to the 6-stage latency of consistent writes of current systems. The 4-stage write to a local SSD (e.g., in Server1 305(1)) triggers an auto-log (log operation) to a remote server (e.g., Server2 305(2)) in order to advantageously avoid CPU intervention in the remote server.

FIG. 3B shows how the latency of consistent writes is reduced to 4-stages as compared to the 6-stage latency of consistent writes (as in FIG. 1B). In the first step (1), the write 354 (write from PCIe 236) is issued to the local SSD 320(1) (in Server1 305(1)) with the write 354 optionally having metadata 356 for logging. As also shown in FIG. 2, a node 235 (e.g., a host 235) issues the write 354 via PCIe (Peripheral Component Interconnect Express) 236.

In the second step (2), the local SSD 320(1) writes to the local media 220(1) such as, e.g., local media 220(1)(a) in Server1 305(1) as well as issuing the consistent write (log write) 359 to one or more remote SSDs. For example, the local SSD 320(1) issues a log write 359 via network 315 to the remote SSD 320(2) in Server2 305(2). The local SSD 320(1) issues a log write 359 to any other remote SSD, if any, that is connected to the network 315. The local media 220(1) and other local media 220 (FIG. 2) can be non-volatile memory devices such as, for example, flash memory devices.

To enable fast writes, the SSD 320 is given an integrated networking element (NE) 210(1) and an embedded networking software 245 (FIG. 2) is run on the compute engine CE. In an embodiment of the invention, the networking software 245 may run on the embedded computing engine 205. In yet another embodiment of the invention, the networking software 245 can be running on the networking element 210 if the networking element 210 is not integrated.

In the third step (3), the remote SSDs (e.g., remote SSD 320(2)) receiving the log write 359 (from SSD 320(1)) will immediately acknowledge the write 359 by transmitting a log write acknowledgement 360. In the example of FIG. 3B, the remote SSD 320(2) receives the log write 359 and immediately acknowledges and immediately transmits the log write acknowledgement 360 via network 315 to the originating SSD (e.g., SSD 320(1) that transmitted the log write 359 (log operation 359 or automatic log write 359). As another example, the remote SSD 320(2) receives a derivative mirror write 361 (instead of a log write 359) and immediately acknowledges and immediately transmits an acknowledgement 360 via network 315 to the originating SSD (e.g., SSD 320(1) that transmitted the derivative mirror write 361.

Finally, in the fourth step 4), when all the remote Acks (acknowledgments) 360 are received by SSD 320(1) from all remote SSDs that received log writes 359, the SSD 320(1) in Server1 305(1) transmits a final acknowledgement 365 to the host 235 (FIG. 2). The final acknowledgement 365 acknowledges to the host 235 about the successful completion of the write 354 in the Server SAN 300 (FIG. 3A).

Figure 3C:
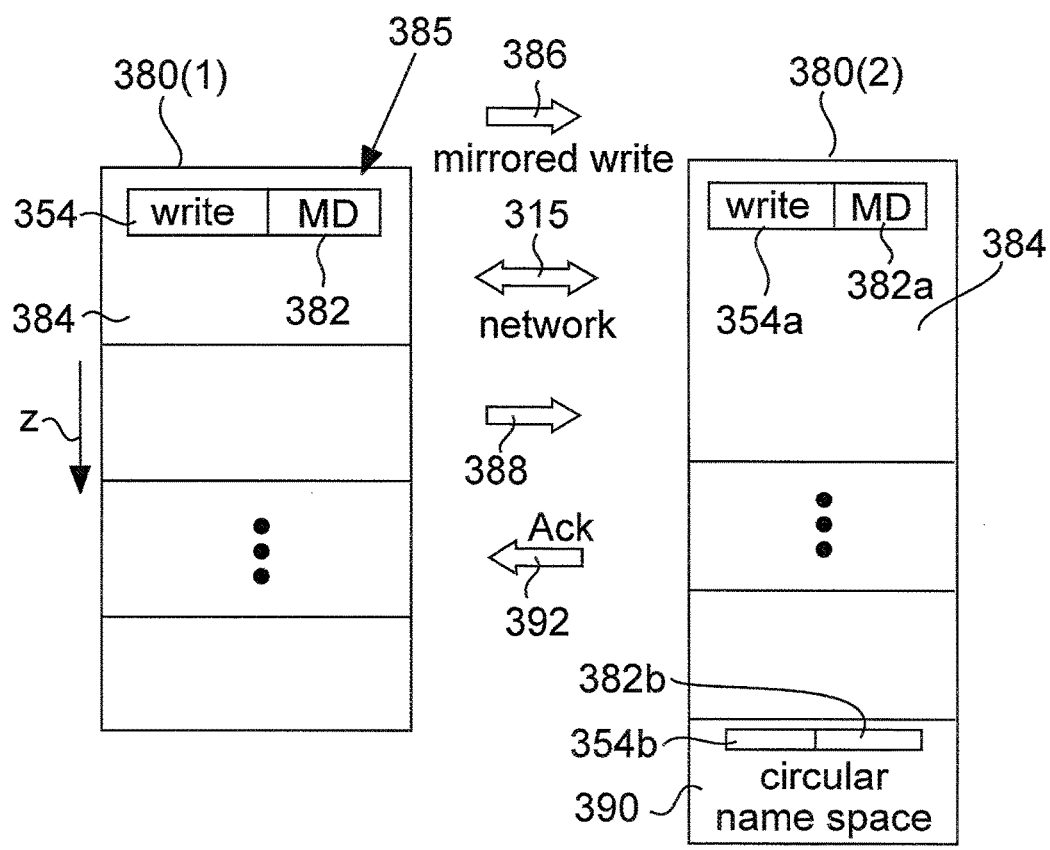
FIG. 3C is a block diagram that shows the logging of writes in a remote SSD, in accordance with an embodiment of the invention.

FIG. 3C is a block diagram that shows the logging of writes in a remote SSD, in accordance with an embodiment of the invention. The SSD 320(1) comprises a memory 380(1) that stores a write 354 and associated metadata 382 for the write 354. The memory 380(1) can be in, for example, the CE 205 (FIG. 2).

The SSD 320(1) can duplicate mirroring or logging (derivative mirror write or log write, respectively) with up to "z" copies wherein each copy corresponds to a given write 354 and metadata 382 associated with that given write, and wherein the value of "z" and the addresses (IP or Internet Protocol addresses for TCP/IP or Transmission Control Protocol/Internet Protocol) are stored in a configuration space 385. For example, this configuration space 385 is stored and maintained in a memory 380(1) in CE 205 (FIG. 2). For mirroring 386 (derivative mirror write 386), the derivative mirror write 386 is replicated to the same block address in remote SSDs 320(2). For example, a derivative mirror write 386 of the write data 354 (in memory 380(1)) will be replicated as mirrored write data 354a (with associated metadata 382a) in a block address 384 in a memory 380(2) in a CE in the remote server 305(2). The block address 384 is the same as the block address 384 in the memory 380(1) wherein this block address 384 in memory 380(1) stores the write data 354 and associated metadata 382.

For logging 388 (log write 388 or log operation 388), the log 354b of the write data and its associated metadata 382b are logged in circular namespaces 390 in the memory 380(2) in the remote SSDs 320(2). The log 354b and associated metadata 382b are a log of write 354 and associated metadata 382. The log 354b and associated metadata 382b are stored in, for example, the circular namespace 390 to permit a faster or immediate transmission of an acknowledgement 392 of a log write, wherein the acknowledgement 392 is immediately transmitted from the remote SSD 320(2) via network 315 to the local SSD 320(1) after the remote SSD 320(2) receives the log write 388.

In an embodiment of the invention, an SSD 320 (e.g., SSD 320(1) is configured to eliminate (or may eliminate) a consistency operation (log operation and/or derivative mirror write) for certain data patterns to save network bandwidth. For example, an SSD can eliminate a consistency operation for certain data patterns (e.g., a pattern such as all zeros). The consistency operation may be completely eliminated or partially eliminated (via pattern elimination or compression). More likely, the scenario is like a log or write compression, which means that there is a consistency operation that still happens but data is compressed.

However, an embodiment of the invention can also eliminate the consistency operation entirely as noted above. A method to eliminate consistency operation entirely comprises logging only those patterns that cannot be eliminated. During rebuild, the method comprises rebuilding all the addresses that were in the logs (or mirror writes). Then, the method comprises going to the remaining addresses (these were patterns that were eliminated). If there was only one pattern (zeroes), the method would just write all zeroes. But this scenario is very unlikely. Accordingly, instead of just eliminating one pattern, the method eliminates multiple patterns by writing part of the consistency log (i.e., the sequence number and the pattern ID). This elimination step can be done even when mirroring (instead of logging) is performed. In mirroring, the method will mirror all writes except the pattern eliminated writes. The pattern eliminated writes will have a special field indicating that they are compressed.

Figure 4:
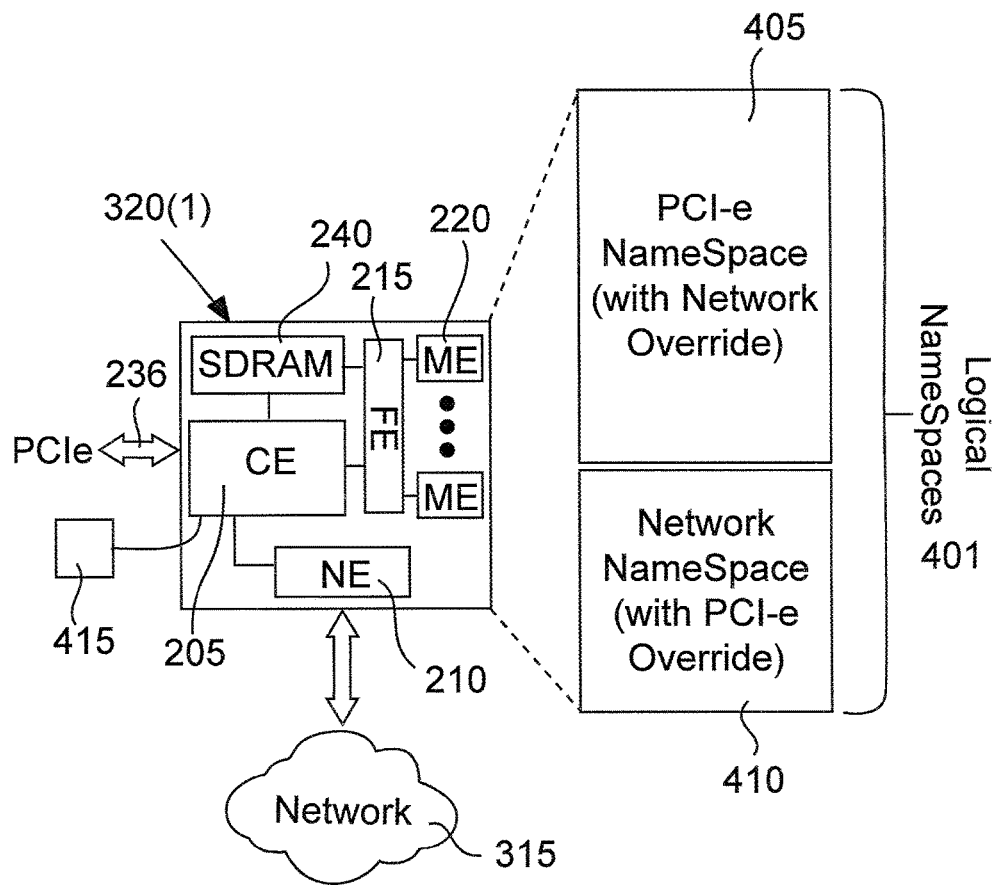
FIG. 4 is a block diagram that shows how the initial namespace is logically partitioned separately for PCI-e (one or many spaces) and Network (one or many spaces), in accordance with an embodiment of the invention.

An embodiment of the invention provides a system and method for a PCIe-attached SSD (e.g., SSD 320(1) in FIG. 3B) to recover after a failure detection by appropriating a remote namespace. In the event that an SSD (e.g., SSD 320(1)) fails or the entire server (e.g., server 305(1) in FIG. 3A) fails, all the namespaces owned by either side (PCIe 236 or network 315 in FIG. 4) can be failed over to the other side (PCIe 236 or network 315). FIG. 4 is a block diagram that shows how an example server 305(1) (FIG. 3A) hat has the initial namespace 401 that is logically partitioned separately for PCIe 236 (one or many PCIe namespaces 405) with override of the network 315 and network 315 (one or many network namespaces 410) with override of the PCIe 236, in accordance with an embodiment of the invention.

In a distributed system (e.g., system 300 in FIG. 3A) requiring remote replication as similarly disclosed herein, the PCI-e 236 side is writing to a local data storage (in SSD 320(1)) and the network 315 side is replicating either data or log to remote SSDs (e.g., remote SSD 320(2) in FIG. 3B). When a server (e.g., server 305(1) in FIG. 3A) fails—depending on the type of the failure, the overrides (in the logical namespace 401) are invoked. The following are two failure modes:

Failure Mode 1. The server (e.g., server 305(1)) completely fails taking down PCIe attached SSDs (e.g., SSD 320(1) of the failed server 305(1) in this example): In this case, the replication software 415 (in a given remote non-failing server coupled to network 315) identifies all the group of remote SSDs (e.g., remote SSD 320(2) in remote server 305(2)) that are part of the replication group for the failed SSDs (e.g., failed SSD 320(1)). The replication software 415 will then let the replication software's respective host server to take over the logical namespace 401 assigned for replication. In this example, the host server that executes the replication software 415 will be any remote non-failing server such as remote non-failing server 305(2) having a replication software 415.

Failure Mode 2. The server (e.g., server 305(1)) fails, but the PCIe attached SSDs (e.g., SSD 320(1) in server 305(1)) are alive (not-failed): In this case, the replication software 415 (in the non-failing remote server 320(2) in this example) overrides the PCIe namespace 405 and gives access to networked servers (i.e., all remote servers coupled to the network 315) so that the remote servers can access the non-failed SSDs 320(1).

The actual mechanism of the logical namespace 401 may be any known method including a simple permission-id (permission identifier) list.

Accordingly, an embodiment of the invention also provides a system 300 (FIG. 3A) with a server 305 (e.g., server 305(2)) having a solid state drive (SSD) 320(2) that is configured to rebuild a failed SSD 320(1) in another server in the system 300. The SSD 320(2) is configured to rebuild the failed SSD to a new SSD (or spare SSD) 320(3) (see FIG. 3A) in distributed SSD system 300 where the new SSD 320(3) automatically rebuilds from all the secondary SSD(s) 320 that are mirroring or logging part of a data or a whole data of the failed SSD 320(1) in the system 300. The secondary SSDs 320 that are mirroring or logging part of a data or a whole data of the failed SSD will be any SSD 320 that is coupled to the network 315 and that executes a replication software 415 (FIG. 4).

In an embodiment of the invention, for mirroring, a non-failing SSD 320 (e.g., non-failing SSD 320(2)) finds (or is configured to find) the mirroring SSDs 320 (in system 300) that performed the derivative mirroring (or mirror writes) that were also disclosed above. A mirroring SSD is mirroring or logging part of a data or a whole data of the failed SSD and is an SSD 320 that is coupled to the network 315. The non-failing SSD 320(2) finds the mirroring SSDs 320 by using a mirror namespace table 401 that has been copied into multiple known locations (in servers 305 or other devices) in the system 300. The previously non-failed server SSD 320(1) previously sent copies of the namespace table 401 to other servers (or other devices) in the system 300 so that the namespace table 401 are mirrored in the other servers or other devices in system 300.

In an embodiment of the invention, for logging, the non-failed SSD (e.g. non-failed SSD 320(2) in this example) recovers (or is configured to recover) all the logs 354b (FIG. 3C) using a log space table 390 (FIG. 3C) copied into multiple known locations (e.g., other servers 305 or other devices) in the system. A log(s) 354b is then obtained by the given non-failed SSD 320(2) from each of the SSDs 320 in the system 300 and reconstructs the logs 354b to rebuild the whole logical-to-physical mapping and data in the SSDs 320 in system 300.

In an embodiment of the invention, a non-failing SSD 320 is configured to rebuild certain values such as all zeros without the SSD reading from any secondary SSD that is mirroring or logging part of a data or a whole data of each SSD in the distributed system, in order to achieve faster rebuilds.

There are various other embodiments of this invention including the optional use of either PCIe or network. In a sense, the invention is more about multi-ported devices and multiple logical namespaces than it is about specificity of those interfaces. So this invention can also be realized via a multiported SSD which is only connected to compute servers via network ports. Additionally, the actual network 115 (FIG. 3A) used could be any of various possibilities including, for example, Ethernet, Fibre Channel (FC), Infiniband (IB), Quickpath, Omnipath, Interlaken, PCIe, etc.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable medium (or non-transitory machine-readable medium or non-transient computer-readable medium or non-transitory computer-readable medium) having stored thereon instructions that permit a method (or that permit a computer) to perform any of the inventive techniques described above, or a program or code that can be stored in an article of manufacture that includes a non-transient computer readable medium (non-transitory computer readable medium) on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
a local server comprising a first peripheral component that is attached to a PCIe (Peripheral Component Interconnect Express) and that is configured to complete a write operation and a consistency operation by transmitting a derivative mirror write or log operation;
wherein the local server transmits the derivative mirror write or log operation in response to a request from a node to the local server;
wherein the request comprises a write from the node to the local server;
wherein the node comprises a host;
a remote server comprising a second peripheral component; and
wherein the write operation and consistency operation are completed without external software intervention in the remote server that is remote from the local server and the first peripheral component;
wherein the local server comprises a first network interface card (NIC);
wherein the first peripheral component comprises a first PCIe drive in the local server;
wherein the remote server comprises a second NIC;
wherein the second peripheral component comprises a second PCIe drive in the remote server;
wherein the first PCIe drive in the local server and the second PCIe drive in the remote server communicate with each other via the first NIC and the second NIC and via a network that is coupled to the first NIC and the second NIC;
wherein the local server transmits a final acknowledgement to the node to indicate a successful completion of the write operation and consistency operation;
wherein the local server transmits the final acknowledgement to the node in response to a derivative mirror write acknowledgement from the remote server to the local server or a log operation acknowledgement from the remote server to the local server and without the local server waiting for a CPU (central processing unit) acknowledgement from the remote server wherein the CPU acknowledgement indicates a completion of a remote write in the remote server;
wherein the remote server immediately transmits the derivative mirror write acknowledgement to the local server in response to the remote server receiving the derivative mirror write that is transmitted from the local server;
wherein the remote server immediately transmits the log write acknowledgement to the local server in response to the remote server receiving the log write that is transmitted from the local server;

wherein the local server comprises a first compute element and a first networking software that runs on the first compute element;
wherein the first compute element is configured to process requests from the node;
wherein the first networking software configures the local server to transmit the derivative mirror write or log operation to the remote server in response to the request from the node to the local server;
wherein the remote server comprises a second compute element and a second networking software that runs on the second compute element; and
wherein the second networking software configures the remote server for mirroring remote writes or for logging remote writes.

2. The system of claim 1, wherein the first peripheral component comprises an NVMe-SSD (non-volatile memory express solid state drive).

3. The system of claim 1, wherein the first peripheral component is included in a distributed storage cluster.

4. The system of claim 3, wherein the distributed storage cluster comprises a server-storage area network.

5. The system of claim 1, wherein the consistency operation may be eliminated for certain data patterns to save network bandwidth.

6. The system of claim 5, wherein one of the certain data patterns comprises a pattern such as all zeros.

7. The system of claim 1, wherein the first peripheral component comprises an integrated networking element that issues the log operation.

8. The system of claim 1, wherein the first peripheral component receives an acknowledgement from a remote peripheral component which comprises the second peripheral component in the remote server, wherein the remote peripheral component immediately transmits the acknowledgement in response to receiving the log operation or the derivative mirror write.

9. A method, comprising:
completing, by a local server comprising a first peripheral component that is attached to a PCIe (Peripheral Component Interconnect Express), a write operation and a consistency operation by transmitting a derivative mirror write or log operation;
wherein the local server transmits the derivative mirror write or log operation in response to a request from a node to the local server;
wherein the request comprises a write from the node to the local server;
wherein the node comprises a host;
where a remote server comprises a second peripheral component; and
wherein the write operation and consistency operation are completed without external software intervention in the remote server that is remote from the local server and the first peripheral component;
wherein the local server comprises a first network interface card (NIC);
wherein the first peripheral component comprises a first PCIe drive in the local server;
wherein the remote server comprises a second NIC;
wherein the second peripheral component comprises a second PCIe drive in the remote server;
wherein the first PCIe drive in the local server and the second PCIe drive in the remote server communicate with each other via the first NIC and the second NIC and via a network that is coupled to the first NIC and the second NIC;
wherein the local server transmits a final acknowledgement to the node to indicate a successful completion of the write operation and consistency operation;
wherein the local server transmits the final acknowledgement to the node in response to a derivative mirror write acknowledgement from the remote server to the local server or a log operation acknowledgement from the remote server to the local server and without the local server waiting for a CPU (central processing unit) acknowledgement from the remote server wherein the CPU acknowledgement indicates a completion of a remote write in the remote server;
wherein the remote server immediately transmits the derivative mirror write acknowledgement to the local server in response to the remote server receiving the derivative mirror write that is transmitted from the local server;
wherein the remote server immediately transmits the log write acknowledgement to the local server in response to the remote server receiving the log write that is transmitted from the local server;
wherein the local server comprises a first compute element and a first networking software that runs on the first compute element;
wherein the first compute element is configured to process requests from the node;
wherein the first networking software configures the local server to transmit the derivative mirror write or log operation to the remote server in response to the request from the node to the local server;
wherein the remote server comprises a second compute element and a second networking software that runs on the second compute element; and
wherein the second networking software configures the remote server for mirroring remote writes or for logging remote writes.

10. The method of claim 9, wherein the first peripheral component comprises an NVMe-SSD (non-volatile memory express solid state drive).

11. The method of claim 9, wherein the first peripheral component is included in a distributed storage cluster.

12. The method of claim 11, wherein the distributed storage cluster comprises a server-storage area network.

13. The method of claim 9, further comprising: eliminating the consistency operation for certain data patterns to save network bandwidth.

14. The method of claim 13, wherein one of the data patterns comprises a pattern such as all zeros.

15. The method of claim 9, wherein the first peripheral component comprises an integrated networking element that issues the log operation.

16. The method of claim 9, further comprising:
receiving, by the first peripheral component, an acknowledgement from a remote peripheral component which comprises the second peripheral component in the remote server, wherein the remote peripheral component immediately transmits the acknowledgement in response to receiving the log operation or the derivative mirror write.

17. An article of manufacture, comprising:
a non-transitory computer-readable medium having stored thereon instructions operable to permit an apparatus to perform a method comprising:
completing, by a local server comprising a first peripheral component that is attached to a PCIe (Peripheral Component Interconnect Express), a write operation and a consistency operation by transmitting a derivative mirror write or log operation;

wherein the local server transmits the derivative mirror write or log operation in response to a request from a node to the local server;

wherein the request comprises a write from the node to the local server;

wherein the node comprises a host;

wherein a remote server comprises a second peripheral component; and wherein the write operation and consistency operation are completed without external software intervention in the remote server that is remote from the local server and the first peripheral component;

wherein the local server comprises a first network interface card (NIC);

wherein the first peripheral component comprises a first PCIe drive in the local server;

wherein the remote server comprises a second NIC;

wherein the second peripheral component comprises a second PCIe drive in the remote server;

wherein the first PCIe drive in the local server and the second PCIe drive in the remote server communicate with each other via the first NIC and the second NIC and via a network that is coupled to the first NIC and the second NIC;

wherein the local server transmits a final acknowledgement to the node to indicate a successful completion of the write operation and consistency operation;

wherein the local server transmits the final acknowledgement to the node in response to a derivative mirror write acknowledgement from the remote server to the local server or a log operation acknowledgement from the remote server to the local server and without the local server waiting for a CPU (central processing unit) acknowledgement from the remote server wherein the CPU acknowledgement indicates a completion of a remote write in the remote server;

wherein the remote server immediately transmits the derivative mirror write acknowledgement to the local server in response to the remote server receiving the derivative mirror write that is transmitted from the local server;

wherein the remote server immediately transmits the log write acknowledgement to the local server in response to the remote server receiving the log write that is transmitted from the local server;

wherein the local server comprises a first compute element and a first networking software that runs on the first compute element;

wherein the first compute element is configured to process requests from the node;

wherein the first networking software configures the local server to transmit the derivative mirror write or log operation to the remote server in response to the request from the node to the local server;

wherein the remote server comprises a second compute element and a second networking software that runs on the second compute element; and wherein the second networking software configures the remote server for mirroring remote writes or for logging remote writes.

* * * * *